US006168658B1

(12) United States Patent
Scalese

(10) Patent No.: US 6,168,658 B1
(45) Date of Patent: Jan. 2, 2001

(54) COMPOSITION FOR MANUFACTURING LOGS FOR HANDLING PALLETS OR BUILDING ELEMENTS SUCH AS PANELS, RUBBLE STONE OR THE LIKE

(75) Inventor: Carmin Scalese, Saint Germain de Bréard (FR)

(73) Assignee: Stanhope Investments, Ltd., Isle of Man (GB)

( * ) Notice: Under 35 U.S.C. 154(b), the term of this patent shall be extended for 0 days.

(21) Appl. No.: 09/353,877

(22) Filed: Jul. 15, 1999

(51) Int. Cl.$^7$ .................................................... C04B 18/26

(52) U.S. Cl. .......................... 106/731; 106/735; 106/737; 106/745

(58) Field of Search .................................... 106/715, 731, 106/735, 737, 745, 805

(56) References Cited

U.S. PATENT DOCUMENTS 4,799,961 * 1/1989 Friberg .

* cited by examiner

Primary Examiner—Paul Marcantoni
(74) Attorney, Agent, or Firm—Harrison & Egbert

(57) ABSTRACT

A composition for manufacturing logs for handling pallets or building elements.

The composition utilizes small-size ligneous waste associated with cement, plaster of pairs, lime, silica and water, the quantities of these various components being as follows:
ligneous waste: 3 to 15 parts in volume
cement: 1 to 2 parts in volume
plaster: 1 to 2 parts in volume
lime: 1 to 2 parts in volume
water: ½ to 5 parts in volume
silica: 1 to 10% in volume of the total volume of the composition.

5 Claims, No Drawings

COMPOSITION FOR MANUFACTURING LOGS FOR HANDLING PALLETS OR BUILDING ELEMENTS SUCH AS PANELS, RUBBLE STONE OR THE LIKE

BACKGROUND OF THE INVENTION (1) Field of the Invention

This invention relates to a composition for manufacturing logs for handling pallets or building elements such as insulating panels, rubble stones or the like.

(2) Description of the Prior Art

It is known that the handling pallets used for moving and transporting goods, such as cardboard boxes or crates of products, are generally made of wood and are comprised of two boards separated by logs forming spacers that create a space for the passing through of elevator-truck forks.

The logs of these pallets are most often made of sawn wood, which increases the manufacturing cost of the pallets.

Various attempts have been made to substitute the wooden logs by logs made of cheaper materials, such as plastic materials, but such materials have the main drawback of being contaminating for the environment, so that the used pallets including such logs are not disposable.

SUMMARY OF THE INVENTION

This invention overcome these drawbacks by providing a composition that unites the advantage of a low cost and of not being contaminating for the environment, and that allows the manufacture of both logs for pallets and construction elements such as insulating panels or rubble stones.

The composition according to the invention is mainly characterized in that it utilizes ligneous waste, such as wood chips or sawdust, intimately mixed with cement, plaster of paris, lime, silica and water.

According to the invention, the implemented quantities of the various components are as follows:
ligneous waste: 3 to 15 parts in volume
cement: 1 to 2 parts in volume
plaster of paris: 1 to 2 parts in volume
lime: 1 to 2 parts in volume
water: ½ to 5 parts in volume
silica: 1 to 10% in volume.

Depending on the product to be achieved, the quantities of the various components may vary within quite broad limits, the ligneous waste being utilized in quantities that vary inversely to the desired hardness of the finished product.

Thus, in the event one wants to manufacture building elements, the ligneous waste is utilized in a quantity of about 10 to 15 parts in volume.

In the event one wants to obtain logs for handling pallets, the ligneous waste is utilized in a quantity of about 3 to 10 parts in volume, the achieved product having a higher hardness, because of its higher cement and plaster of paris content.

The mixing of the components occurs in a mixer of a type known in the art water being added preferably after having been slightly preheated at about 30° C., so as to speed up the hardening of the cement and to allow time saving during the removal of the finished product from the mold. The quantity of water added to the mixture of the other components of course depends on the water content of the implemented ligneous waste and can be modulated accordingly.

The mixture is transferred into molds the shapes and sizes of which are adapted to the product one wants to obtain.

In the case of pallet logs, the mixture is preferably cast into cylindrical molds, but it can also be cast into cubic or parallelepipedic molds.

In the case of insulating materials, the mixture is cast into parallelepipedic molds the dimensions of which are chosen so as to provide panels, bricks, rubble stones or the like.

In either case, the components are mixed in a classical mixer for 5 to 10 minutes, then transferred into the molds.

The removal of the finished products from the molds can occur after a very short period of time, in the range of 1 to 30 minutes, which is a considerable advantage in terms of time savings.

The ligneous waste implemented for manufacturing logs according to the invention must be of small sizes, in order to enhance the quality of the mixture made. Thus, the wood chips preferably have average sizes in the range of 1 cm in length by 1 mm in width and they can be used mixed with sawdust. One may also use sawdust alone.

The addition of lime and silica to the mixture formed by cement, plaster of paris, water and ligneous waste guarantees a better cohesion of the end product, thus a longer life, regardless of whether it is used for pallet logs or building elements.

Further advantages and features of the composition according to the invention will become clear from the following examples that describe two embodiments of it, one applying to the manufacturing of pallet logs and the other one to the manufacturing of building panels.

DESCRIPTION OF THE PREFERRED EMBODIMENTS

EXAMPLE 1

Manufacturing of pallet logs

Into a classical mixer are successively poured:
10 liters of cement
10 liters of plaster of paris
10 liters of lime
50 liters of woody waste
10 liters of water at 30° C.
10 liters of silica These components are mixed for 5 minutes, then the mixture is cast into molds that may be cylindrical or parallelepipedic, according to the desired shape of the logs.

After 1 to 10 minutes, depending on the temperature and the water content of the room, the logs, which have a hardness and a degree of humidity allowing their storage, can be removed from the molds. After drying in a dry closed space for about one week, the logs can be used.

The logs obtained have a very good mechanical strength and an excellent resistance with time.

EXAMPLE 2

Manufacturing of building panels

According to the process of example 1, into a mixer are successively poured:
10 liters of cement
10 liters of plaster of paris
10 liters of lime
120 liters of woody waste
20 liters of water at 30° C.
30 liters of silica Those components are mixed for 5 minutes, then the obtained mixture is transferred into parallelepipedic of chosen sizes.

After 3 to 15 minutes, depending on the environment, the obtained mixture be removed from the molds. The panel can be stored and used after about one week drying.

The panels obtained have excellent thermal and acoustic insulation qualities and an excellent life span.

What is claimed is:

1. A composition for manufacturing logs for use in handling pallets or building materials consisting of:

ligneous waste of 3 to 15 parts in volume, said ligneous waste selected of a material from the group consisting of wood chips and sawdust;

cement of 1 to 2 parts in volume;

plaster of paris of 1 to 2 parts in volume;

lime of 1 to 2 parts in volume;

water of ½ to 5 parts in volume; and silica of 1 to 10% in volume relative to the total volume of the composition.

2. The composition of claim 1, said ligneous waste being wood chips with an average size of approximately 1 centimeter in length by 1 millimeter in width.

3. The composition of claim 1, said ligneous material being wood chips mixed with sawdust.

4. The composition of claim 1, said ligneous waste being 3 to 10 parts in volume.

5. The composition of claim 1, said ligneous waste being 10 to 15 parts in volume.

* * * * *